United States Patent
Bailey et al.

(10) Patent No.: US 9,874,126 B2
(45) Date of Patent: Jan. 23, 2018

(54) NON-THERMAL PARTICULATE FILTER REGENERATION

(71) Applicant: Illinois Valley Holding Company, Chillicothe, IL (US)

(72) Inventors: Brett Bailey, Dunlap, IL (US); William Mitchener, Peoria Heights, IL (US)

(73) Assignee: Illinois Valley Holding Company, Chillicothe, IL (US)

(*) Notice: Subject to any disclaimer, the term of this patent is extended or adjusted under 35 U.S.C. 154(b) by 0 days.

(21) Appl. No.: 14/420,169

(22) PCT Filed: Aug. 2, 2013

(86) PCT No.: PCT/US2013/053456
§ 371 (c)(1),
(2) Date: Feb. 6, 2015

(87) PCT Pub. No.: WO2014/025647
PCT Pub. Date: Feb. 13, 2014

(65) Prior Publication Data
US 2015/0204222 A1    Jul. 23, 2015

Related U.S. Application Data

(60) Provisional application No. 61/742,342, filed on Aug. 8, 2012.

(51) Int. Cl.
*F01N 3/023* (2006.01)
*B01D 46/24* (2006.01)
(Continued)

(52) U.S. Cl.
CPC ....... *F01N 3/0233* (2013.01); *B01D 46/0067* (2013.01); *B01D 46/0068* (2013.01);
(Continued)

(58) Field of Classification Search
CPC ...... F02D 41/029; F01N 9/002; F01N 3/0842; F01N 13/02; F01N 3/035
(Continued)

(56) References Cited

U.S. PATENT DOCUMENTS 4,875,336 A * 10/1989 Hayashi ............... F01N 3/0233
55/302
5,390,492 A * 2/1995 Levendis ............... F01N 3/023
55/302

(Continued)

FOREIGN PATENT DOCUMENTS

DE        4428214 A1     2/1995

*Primary Examiner* — Patrick Maines
(74) *Attorney, Agent, or Firm* — Miller Canfield

(57) ABSTRACT

A particular trap is regenerated without the use of heat. The regeneration is accomplished using a valving mechanism for periodically creating a reverse pressure throughout the entire trap, after the reverse pressure is created controls are operative to start a regeneration cycle by creating a substantially instantaneous reverse pressure drop across the porous walls of the entire trap to dislodge accumulated particulate cake and by causing the filtered exhaust gas to flow back through the porous walls to remove the dislodged particulate from the trap. A settling tank is connected to the exhaust pipe upstream of the trap to receive and store the dislodged particulate. The controls are operative to return the system to its filtering operation. Gaseous effluent from the tank is returned to the exhaust system upstream of the filter to provide a "closed system" in which only filter gas is discharged to atmosphere.

20 Claims, 7 Drawing Sheets

(51) Int. Cl.
*B01D 46/00* (2006.01)
*F01N 9/00* (2006.01)

(52) U.S. Cl.
CPC ......... *B01D 46/2418* (2013.01); *F01N 9/002* (2013.01); *F01N 2240/26* (2013.01); *Y02T 10/47* (2013.01)

(58) Field of Classification Search
USPC ................. 60/295, 281, 288, 291, 286, 303; 55/282.3, DIG. 10, 523
See application file for complete search history.

(56) References Cited

U.S. PATENT DOCUMENTS

| | | | | |
|---|---|---|---|---|
| 5,426,936 A | * | 6/1995 | Levendis | F01N 3/023 55/302 |
| 5,458,673 A | * | 10/1995 | Kojima | F01N 3/0233 123/198 E |
| 5,725,618 A | * | 3/1998 | Shimoda | B01D 46/0063 55/283 |
| 5,930,994 A | * | 8/1999 | Shimato | F01N 3/023 55/302 |
| 5,941,066 A | * | 8/1999 | Araki | F01N 3/023 55/284 |
| 6,036,751 A | | 3/2000 | Ribardi et al. | |
| 6,233,926 B1 | * | 5/2001 | Bailey | F01N 3/0222 137/625.31 |
| 6,989,045 B2 | * | 1/2006 | Bailey | B01D 46/0058 422/168 |
| 2004/0226290 A1 | * | 11/2004 | Bailey | F01N 3/0214 60/297 |
| 2006/0070359 A1 | * | 4/2006 | Sellers | B01D 46/0064 55/303 |
| 2008/0092525 A1 | * | 4/2008 | Ehlers | F01N 3/023 60/286 |
| 2009/0000477 A1 | * | 1/2009 | Meister | B01D 41/02 95/279 |
| 2010/0269488 A1 | | 10/2010 | Bailey | |
| 2010/0307339 A1 | | 12/2010 | Tadrous et al. | |
| 2013/0145747 A1 | | 6/2013 | Bailey | |

* cited by examiner

NON-THERMAL PARTICULATE FILTER REGENERATION

CROSS-REFERENCE TO RELATED APPLICATIONS

This application is a U.S. National Phase application of International Application No. PCT/US13/53456 filed Aug. 8, 2013, which claims the benefit of provisional patent application Ser. No. 61/742,342 filed Aug. 8, 2012 by the present inventors.

DISCUSSION OF PRIOR ART

Commercially available diesel exhaust treatment systems utilize a particulate filter which is thermally regenerated. Diesel fuel is a convenient source of energy for such regeneration. During active filter regeneration, the exhaust gas temperature can be increased by combusting an additional quantity of fuel in the exhaust system using specialized hardware and using one of the following methods:
- Flame combustion—the fuel is combusted in a fuel burner, usually with a dedicated supply of combustion air, with the flame entering the exhaust system.
- Catalytic combustion—the fuel is introduced through an exhaust injector, evaporated and mixed with exhaust gas, and oxidized over an oxidation catalyst.
- Combined flame and catalytic combustion—a combination of the above methods, where a fuel burner is followed by a catalytic combustion system.

Further details can be found in "Filters Regenerated by Fuel Combustion" by W. Addy Majewski.[1] In short, the removed particulate is burned and creates $CO_2$ which is passed into the atmosphere.

[1] Majewski, W. Addy. "Filters Regenerated by Fuel Combustion." *Diesel Technology Guide—Diesel Filter Systems*. Dieselnet, 2009. Web. 27 May 2010. <http://www.dieselnet.com/tech/pf_sys_fuel.html>.

An exhaust regeneration system developed by Illinois Valley Holding Company uses a back flow of filtered exhaust gases to regenerate a segment of the filter. The removed particulate is then burned in a separate burner which also creates $CO_2$ which is passed to the atmosphere. It is desirable to create a system which precludes the release of $CO_2$ into the atmosphere.

SUMMARY

In accordance with one embodiment of the present invention there is provided a system for regenerating a particulate trap in an exhaust system of an internal combustion engine and including a wall-flow particulate trap located in the engine's exhaust pipe and having a plurality of porous walls for filtering engine exhaust and removing particulates therefrom to form a particulate cake on the porous walls, a valving mechanism downstream of said trap for periodically creating a reverse pressure throughout said entire trap, a reversing mechanism operative after the reverse pressure is created for periodically creating a substantially instantaneous reverse pressure drop across the porous walls of said trap to dislodge accumulated particulate cake and causing the filtered exhaust gas to flow back through the porous walls to remove the dislodged particulate from said trap and carry the dislodged particulate therefrom, controls for starting and stopping a regeneration cycle, and a reservoir closed from the atmosphere and operatively connected to the exhaust pipe upstream of the trap for receiving the back-flow gas carrying the dislodged particulate from said trap and storing said dislodged particulate.

In accordance with another aspect of the present invention there is provided a non-thermal system for regenerating an entire particulate trap in an exhaust system of an internal combustion engine and including a wall-flow particulate trap located in the engine's exhaust system and having a plurality of porous walls for filtering engine exhaust and removing particulates therefrom to form a particulate cake on the porous walls, a valving mechanism downstream of said trap for periodically creating a reverse pressure throughout said entire trap, a reversing mechanism operative after the reverse pressure is created for periodically creating a substantially instantaneous reverse pressure drop across the porous walls of said entire trap to dislodge accumulated particulate cake and causing the filtered exhaust gas to flow back through the porous walls to remove the dislodged particulate from said entire trap and carry the dislodged particulate therefrom, and controls for starting and stopping a regeneration cycle.

Other features of the present invention provide a "closed system" in which only filtered gases are released to the atmosphere; pneumatic controls for starting and stopping the regeneration cycle; and a method for regeneration of an entire particulate filter, and/or for storing the removed particulate.

Advantages of Present Invention

The present invention discloses a particulate trap regeneration system which provides one or more of the following advantages: 1—eliminates heating of the filter during regeneration; 2—eliminates the need to oxidize carbon stored in the trapped particulate matter; 3—provides a settling tank to accumulate the removed particulate; 4—allows regeneration of the filter while the engine is under load; 5—provides recycling of gases from the settling tank through the filter via a "closed" system; 6—provides a simplified control system which utilizes available pressure from the exhaust system; 7—allows a higher gram-loading of particulate in the filter; 8—provides for regeneration of an entire trap in a short period of time.

The resultant benefits of the above are less fuel consumption; less disadvantage of having higher particulate deposits in the filter; improved filtration efficiency; a less expensive system than the thermally regenerated systems which requires more sophisticated hardware and control systems; eliminates the need for oxidizing the particulate in the filter which can damage the filter, the intumescent wrap, and any downstream aftertreatment; reduces and possibly eliminate downtime required for forced active regeneration and ash maintenance; and eliminates the need of controlled interaction of the particulate filter and the engine necessitated in the thermally regenerated systems.

Other features and advantages of the present invention will become apparent from the following detailed description when taken with the drawings.

BRIEF DESCRIPTION OF THE DRAWINGS

The drawings illustrate one embodiment of a particulate trap regeneration system incorporating the above advantages and in which—

DETAILED DESCRIPTION

Figure 1:
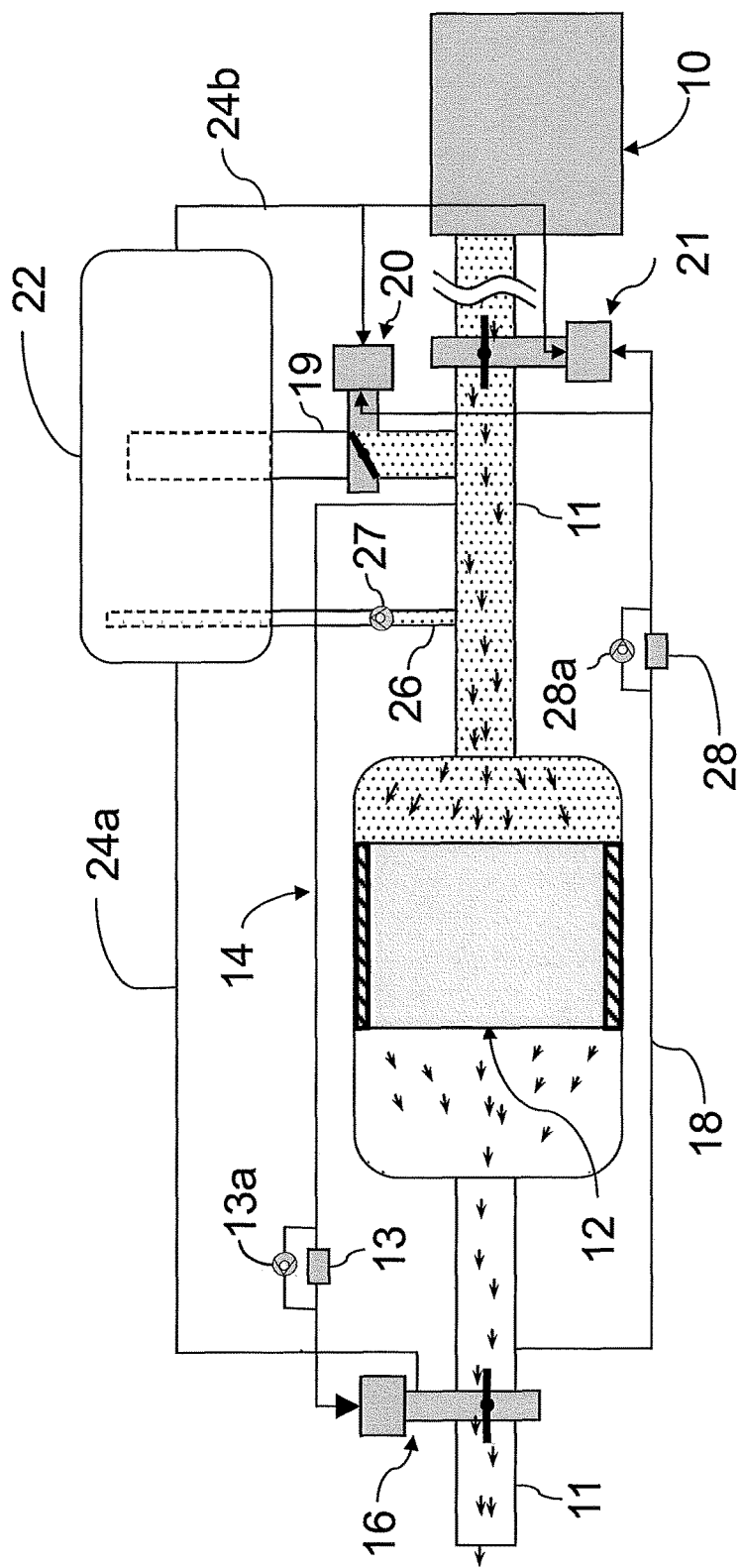
FIG. 1 is a diagrammatic illustration of the best known mode of carrying out the present invention and with the system in normal operation.
Figure 2:
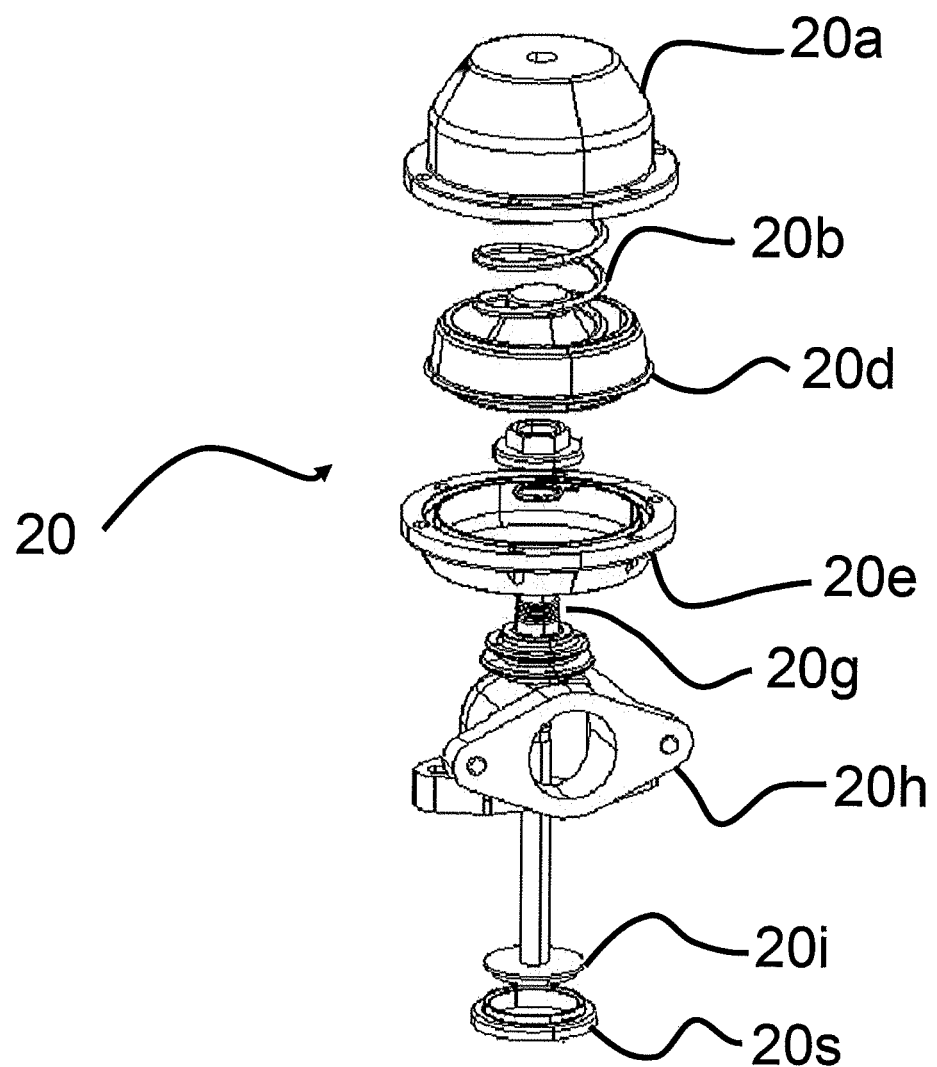
FIG. 2 is an exploded view of a suitable valve utilized in the FIG. 1 embodiment.

FIG. 1 illustrates a particulate trap regeneration system operative to filter engine exhaust. Particulates generated by incomplete combustion of fuel in an engine 10 travel down an exhaust pipe 11 and are accumulated in a particulate filter (PF) or trap 12. Flow through the exhaust pipe is shown by arrows in FIG. 1. The PF or trap 12 may be a cordierite filter manufactured by Corning Inc. of Corning, N.Y., U.S.A. The particulates accumulated in the PF begin to restrict the flow across the PF increasing the pressure in the exhaust system (backpressure). The shading in exhaust pipe 11 is indicative of pressure in the engine exhaust upstream of the trap 12. The absence of shading downstream of the trap indicates that it is exiting to atmosphere. A line 14 connects the exhaust pipe 11 upstream of the PF 12 with a normally-open valve 16, advantageously in the form of a pneumatically-actuated poppet valve having a diaphragm. As is known to those skilled in the art, components of valve 16 may be similar to those of a normally-closed valve such as shown in FIG. 2, with a change in arrangement to transform a normally-closed valve to one that is normally-open.

A normally-closed pneumatically-actuated dump valve 20 is positioned upstream of the PF and located in a pipe 19. FIG. 2 is an exploded view of a suitable valve for utilization as normally closed valve 20. It is a commercially available valve sold by Tial Products Inc. of Owosso, Mich., U.S.A. It includes an actuator top 20a, a spring 20b, a diaphragm assembly 20d, an actuator bottom 20e, a valve guide 20g, a housing 20h, an internal valve 20i, and a valve seat 20s.

Figure 3:
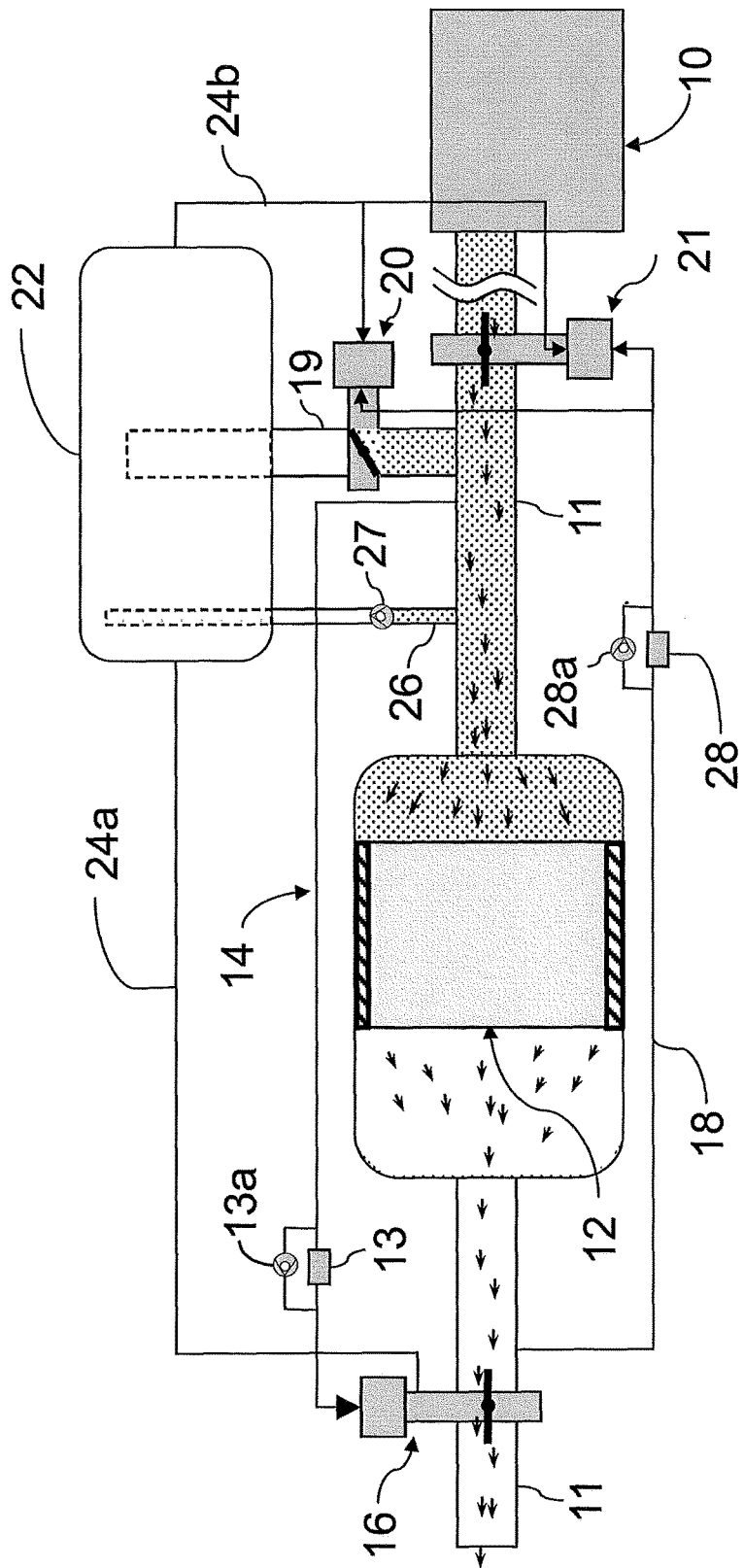
FIG. 3 is a view, similar to FIG. 1, illustrating the back pressure build-up indicating that filter regeneration is needed.

FIG. 3 illustrates the accumulation of particulate matter in the PF 12 and subsequent increase in backpressure. This increase is illustrated by the increased density of the shading in pipe 11 and at the upstream side of the PF 12. Line 14 incorporates a blow-off valve 13 which opens when line pressure reaches a preselected set point. Once the backpressure reaches the determined set point, valve 13 opens and causes valve 16 to close thereby closing the system from atmosphere and initiating a regeneration cycle (see FIG. 4). The engine 10 pressurizes the system through the PF to the valve 16. This pressure is another increase as illustrated by the further increased density of the shading in exhaust pipe 11 and downstream of the PF, but now also throughout the PF. As an alternative, valve 16 could be an exhaust brake-type relief valve. A control line 18 connects the exhaust pipe 11 downstream of the PF 12 to the normally-closed pneumatically-actuated dump valve 20 positioned upstream of the PF and located in pipe 19. Line 18 incorporates a blow-off valve 28 which opens when the regeneration pressure reaches a set point, conveniently 25 psig, and causes dump valve 20 to open. Thus the two valves 16 and 20 are operated sequentially. Blow-off valves 13 and 28 have check valves 13a and 28a, respectively, for purposes hereinafter explained. A normally-open pneumatically-actuated relief valve 21 is positioned in exhaust pipe 11 between pipe 19 and engine 10, but advantageously considerably closer to pipe 19. Because valve 21 is connected to line 18 upstream of valve 20, valve 21 is actuated (i.e. closed) before valve 20 is actuated (i.e. opened). However it is perceived that valve 21 may not be necessary for many applications. The sequential operation, first of valve 16 and then valve 20, results whether or not valve 21 is incorporated.

Figure 4:
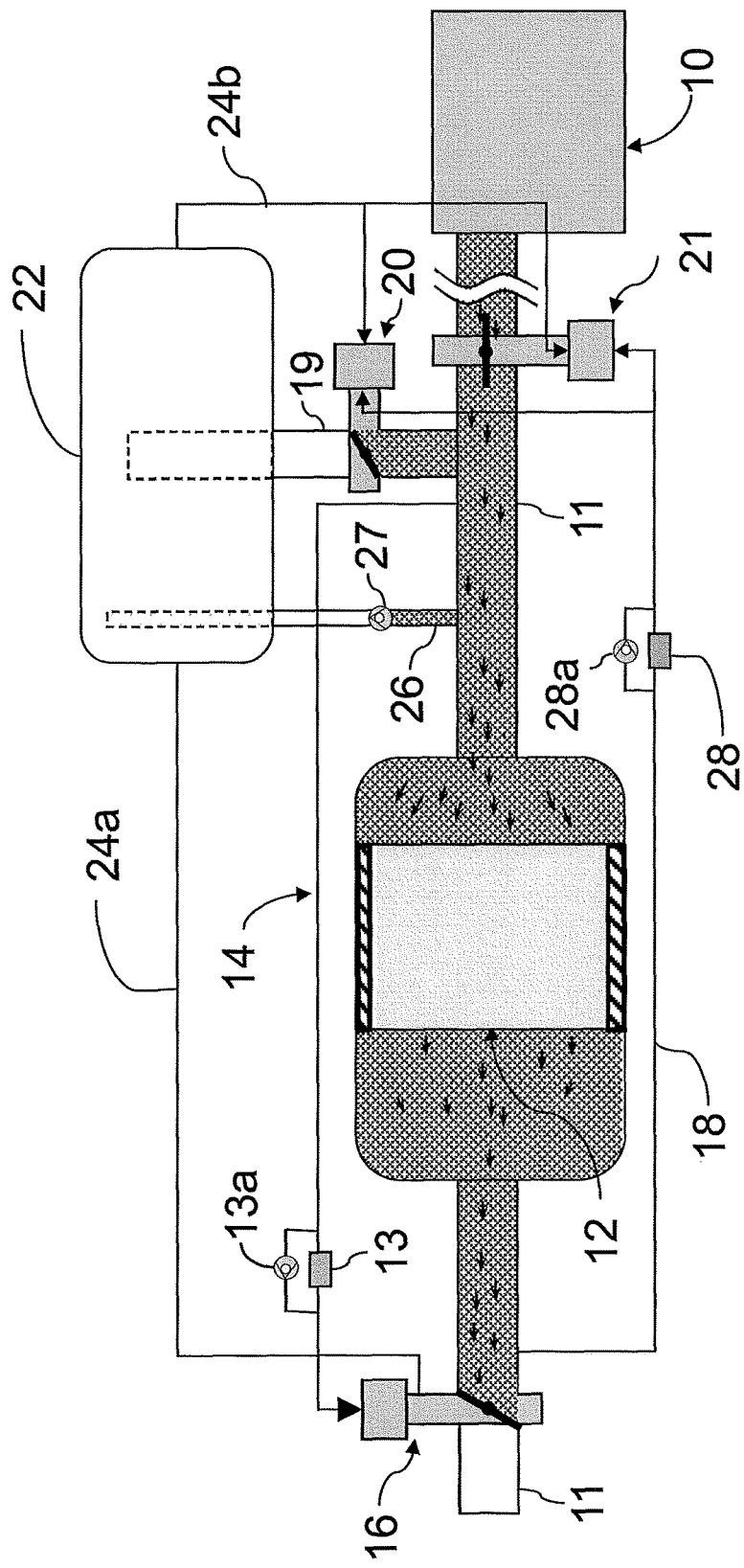
FIG. 4 is a view, similar to FIG. 1, illustrating pressure build-up in the system prior to regeneration of the filter.
Figure 5:
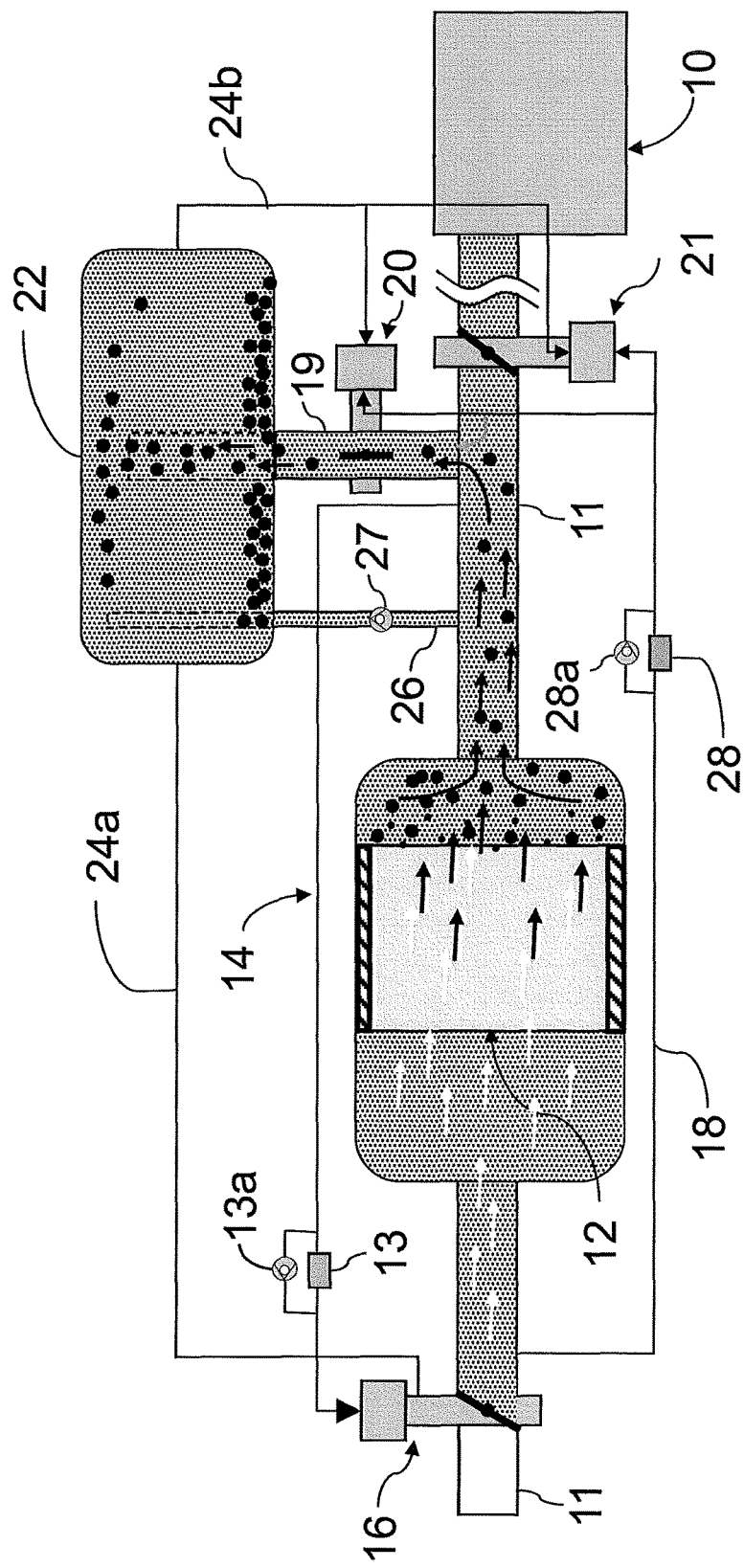
FIG. 5 is a view, similar to FIG. 1, illustrating regeneration of the filter and dumping to a settling tank.

Referring to FIGS. 4 and 5, opening of dump valve 20 connects the pressurized system to a lower pressure storage or settling tank 22. Tank 22 can also be referred to as a receptacle or reservoir. This creates a reverse depression wave through the PF 12 which physically breaks off the particulate and, as shown by arrows in FIG. 5, transports it away from the PF into the settling tank 22. This happens very rapidly in a matter of seconds, and the entire PF 12 is regenerated. The volume of the settling tank 22 is related to the engine size, particulate matter storage requirements, and other design parameters. It is perceived that the volume is more important than the shape of the settling tank. Hence the term "tank" is to be taken as suggestive of a closed volume.

Figure 6:
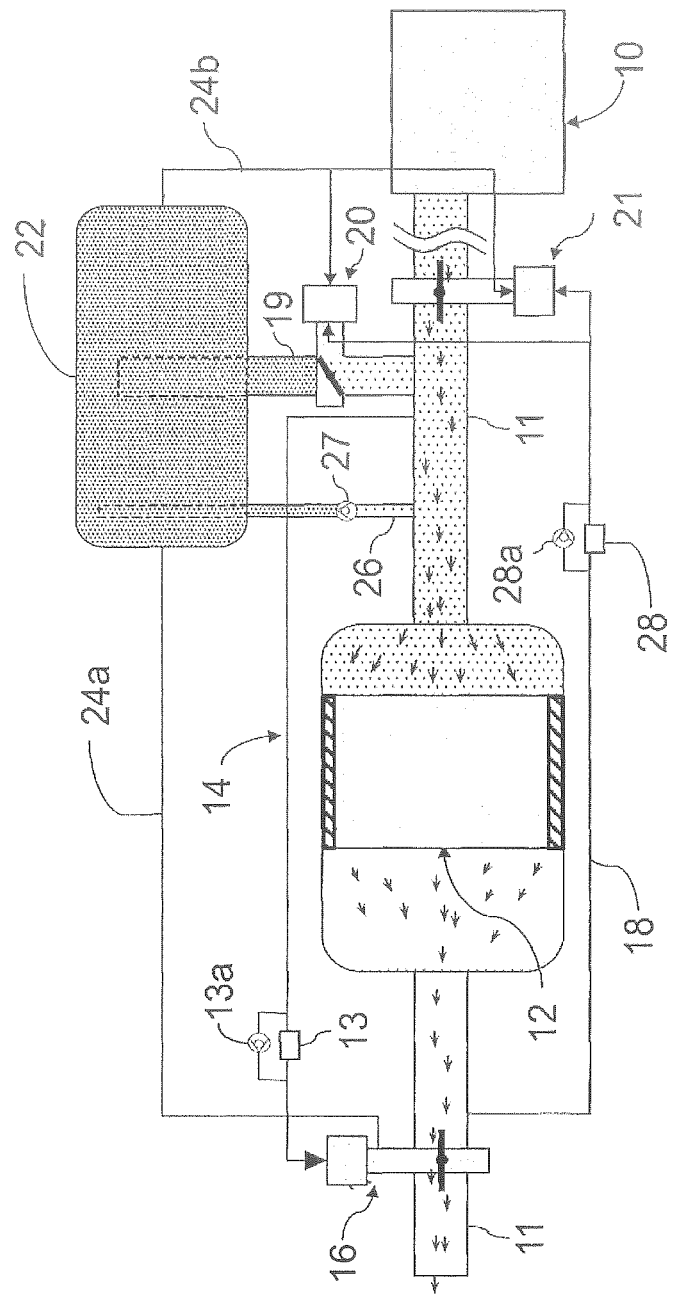
FIG. 6 is a view, similar to FIG. 1, illustrating the system after regeneration and return to normal filtering operation.

Referring now to FIG. 6, as the particulate matter is channeled into the settling tank 22, the pressure therein will begin to increase and as the pressure in the settling tank rises, a control tube 24a connected to the normally-open valve 16 equalizes the pressure across its valve diaphragm (such as shown at 20d in FIG. 2) allowing valve 16 to open and the system downstream of the PF to return to near atmospheric conditions. Simultaneously, a second control tube 24b connected to normally-closed dump valve 20 equalizes the pressure across the valve 20 diaphragm 20d allowing valve 20 to close.

The filtered exhaust gas which transported the particulate matter to the settling tank 22 is then allowed to bleed back into the exhaust pipe 11 upstream of the PF via a return line 26. The return line 26 has a check valve 27 which opens to allow such bleed back flow. An orifice (not shown) can serve the same function or the orifice and check valve can be used in combination. It is perceived that a venturi in exhaust pipe 11 can operate with line 26 to draw down pressure in settling tank 22. In this manner gases from the settling tank 22 are filtered once again by the PF before exiting to the atmosphere. It will be noted that said gases are not the only gases in the settling tank because a percentage is unfiltered exhaust gas. The control pressures to valve 16, 20, 21 are bled from control lines 14 and 28 utilizing check valves 13a and 28a, respectively. The bleeding back to exhaust pipe 11 insures that the valves 16, 20, and 21 are not reactivated before the next regeneration is required.

It will be noted that what has been described is a closed system and this approach not only removes the particulate matter cake but assures that any gas exhausting to atmosphere has been cleaned by the PF 12. For example, by passing the effluent of the settling tank through the PF, any particles that may be transported out of the settling tank will be caught by the filter.

It is now deemed apparent that the above-described apparatus causes regeneration of the entire filter via a process having steps performed in the following sequence:
1. Filtering engine exhaust gases until the particulate filter 12 requires regeneration (FIG. 3.)
2. Shutting exhaust valve 16 downstream of the particulate filter to build up pressure in the exhaust system. (FIG. 4.)
3. Opening valve 20 upstream of the particulate filter to create a differential pressure across the filter 12.

4. Directing the flow of filtered exhaust back through the particulate filter to fracture or remove the particulate cake and carry it into settling tank 22.
5. Opening the exhaust valve 16 to return the system to filtering operation.
6. Bleeding gases in the settling tank to the exhaust system upstream of the particulate filter.

As described above these regeneration steps occur very rapidly and, hence, the entire particulate trap 12 can be regenerated while the engine 10 is running (i.e. is idling or under load); or during braking where the pressurization of the trap would be completed without any additional fuel use.

Figure 7:
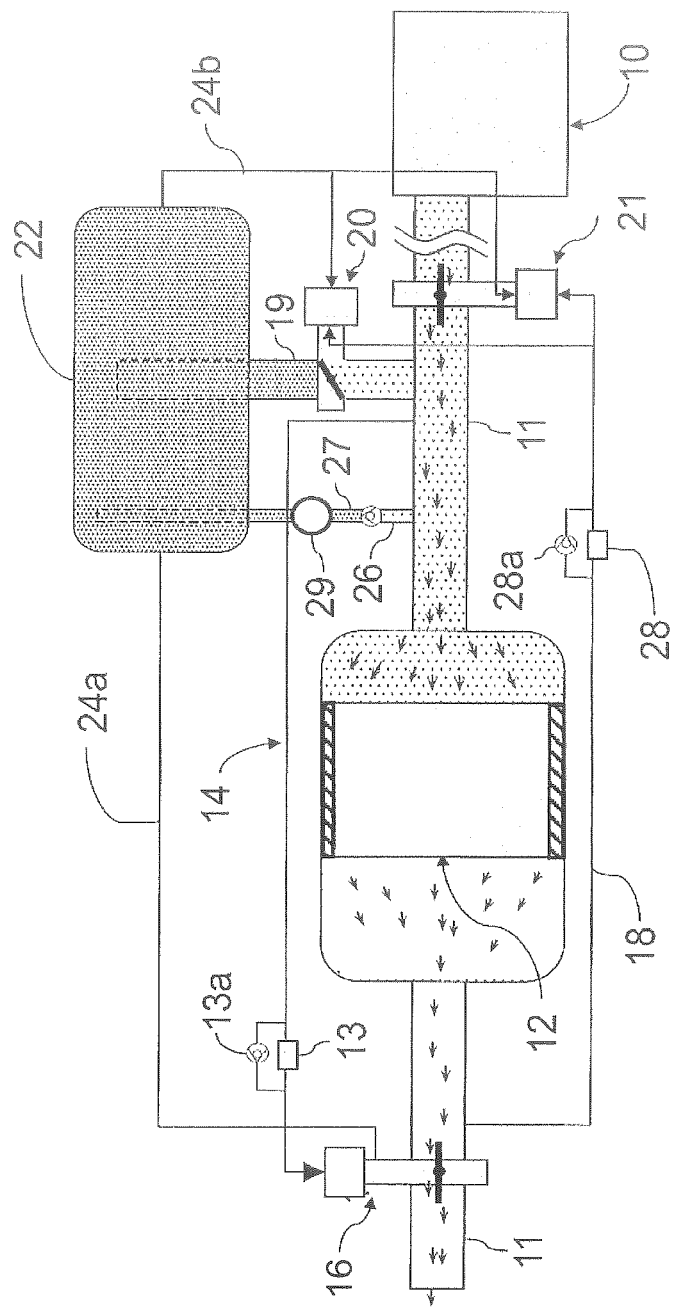
FIG. 7 is a diagrammatic illustration of another embodiment for carrying out the present invention.

FIG. 7 illustrates an alternate embodiment of the system. A vacuum pump 29, consisting of a venturi and air pressure source or utilizing a pump and motor, is utilized to evacuate a portion or all of the exhaust gases that are present in settling tank 22 before regeneration. The evacuation of the gases reduces the pressure in the settling tank 22 to create a differential pressure between the settling tank 22 and the exhaust 11. Once the settling tank has reached a pressure set point that is sufficiently below the pressure in exhaust 11, valve 21 is closed to reduce the volume and valve 20 opens creating a differential pressure across the particulate filter 12. This differential pressure breaks off the particulate from the filter and creates a differential pressure gas flow that transports the particulate material into the settling tank 22. After regeneration, valve 20 is shut and valve 21 is opened allowing the system to resume normal operation.

In this embodiment, a venturi connected with a compressed air line (not shown), for example from the air brake system on a vehicle or plant air for stationary engines, generates the required lower pressure in the settling tank 22 prior to regeneration. The gases in the settling tank 22, which may have suspended particulate matter therein when exiting the venturi, travel through pipe 26 back into exhaust 11. On entering the exhaust 11, the gasses pass through and are filtered again by particulate filter 12, thereby removing any entrained particulate matter before the gasses exit to ambient. Regeneration of the particulate filter 12 may occur advantageously during vehicle braking, where the compressor would regenerate the braking forces into the needed compressed air for particulate filter regeneration. The regeneration pressure can also be harnessed over multiple braking conditions until the settling tank 22 is at regeneration level. Additional opportune times for regeneration would be at startup and/or when the vehicle is stopped because at those times there is limited demand on vehicle's brake system. While the air brake pump can be utilized as vacuum pump 29, any entrained particulate matter in the gasses exiting the settling tank 22 could potentially affect the performance and/or durability of the pump.

In another embodiment, a venturi (not shown) which operates with return line 26 and venture bypass (not shown) are both located in exhaust pipe 11. The venturi and venturi bypass operate to reduce pressure in the settling tank 22 while allowing low normal operating backpressure on the engine. In order to not generate backpressure equivalent to the pressurization of exhaust 11 in the preferred embodiment, the lower amount of pressure drop created with this embodiment would require pressure to be generated in exhaust 11 in order to attain sufficient differential pressure for regeneration. The combination of settling tank 22 pressure level below that of the gases in exhaust 11 along with an increase in pressure in exhaust 11 above normal operating pressure would work together to create a sufficient differential pressure for regeneration while reducing the regeneration backpressure requirements of the engine.

The advantage of creating a lower pressure in settling tank 22 relative to pressurizing exhaust 11 is that the energy required for regeneration would be from a separate power source then the engine creating backpressure. This avoids altering the engine's performance and operation such that regeneration could occur at high engine loads. In large engine designs where the settling tank size could not be packaged for entire trap regeneration, the PF could be regenerated in segments.

In another version, the vacuum is generated by the engine with the use of an intake air system throttling valve. Under braking conditions, the throttle valve would close in the intake air system of the engine. The positive displacement action of the engine would pull a vacuum on the engine. This type of system would experience a delay in operation until sufficient air was reintroduced for combustion to efficiently take place if power was demanded during the regeneration.

While the above process steps have been described as used with specific apparatus, it should be understood that the steps are not to be limited to such arrangements and that other apparatus may be utilized to perform the steps. Similarly, the specific steps and their sequence may be modified and/or combined to perform the intended result.

While the above description is of the best known mode, it should not be construed as any limitation on the scope of the invention, as other variations will become apparent to those skilled in the art and the scope should be determined only by the scope of the appended claims.

What is claimed is:

1. A system for regenerating a particulate trap in an exhaust system of an internal combustion engine, comprising:
   a wall-flow particulate trap located in the exhaust pipe of an engine and having a plurality of porous walls for filtering a flow of engine exhaust flowing in the exhaust pipe and removing particulates therefrom to form a particulate cake on an upstream first side of the porous walls wherein filtered exhaust gas flows downstream from a downstream second side of the porous walls,
   a first valve downstream of said trap and a dump valve upstream of said trap for periodically creating a reverse pressure throughout said entire trap for regeneration of the trap wherein said reverse pressure creates an instantaneous reverse pressure drop across the porous walls of said entire trap to dislodge accumulated particulate cake from said upstream first side and causes the filtered exhaust gas to flow back as a back-flow gas through the porous walls to remove dislodged particulate from said trap and carry the dislodged particulate therefrom;
   a reservoir operatively connected to the exhaust pipe by said dump valve for receiving the back-flow gas carrying the dislodged particulate from said trap and storing said dislodged particulate, said reservoir being closed from atmosphere and selectively communicating with said exhaust pipe through said dump valve; and
   a one-way conduit leading from the reservoir to the exhaust pipe upstream of said trap to permit a return flow of gas from the reservoir after receipt of the dislodged particulate from the trap so that said return flow of gas is returned to the flow of exhaust gas in the exhaust pipe and passes through the particulate trap, thereby providing a closed mechanical system in which only filtered gases are released to atmosphere.

2. The system according to claim 1, further characterized in that the first valve is also operative as an exhaust brake, and wherein operation of the exhaust break initiates regeneration of the trap.

3. The system according to claim 1, wherein the first valve includes a relief valve having a first normally-open position permitting the flow of filtered exhaust to atmosphere and a second position restricting the flow of the filtered exhaust until the pressure throughout the exhaust system reaches a pre-selected level.

4. The system according to claim 1, wherein the operative connection of the reservoir to the exhaust pipe is a purge duct.

5. The system according to claim 4, wherein the purge duct valve is operable to drop the pressure at the inlet side of the trap and thereby create a pressure drop sufficient to dislodge portions of the cake.

6. The system according to claim 4, further characterized in that the first valve is operative as an exhaust brake, and wherein operation of the exhaust break initiates regeneration of the trap.

7. The system according to claim 1, wherein the first valve is a relief valve having a first normally-open position permitting flow of the filtered exhaust to atmosphere and a second position restricting the flow of the filtered exhaust until the pressure throughout the exhaust system reaches a pre-selected level.

8. The system according to claim 1, including a first pneumatic line interconnecting the first valve with the exhaust pipe upstream of the trap, the first valve being responsive to a build-up in pressure caused by accumulated particulate cake in the trap thereby determining the need for regeneration, wherein said first valve moves to a closed position to start a regeneration cycle in response to the build-up in pressure.

9. The system according to claim 8, including a second pneumatic line interconnecting the dump valve with the exhaust pipe, the second valve being responsive to build-up of pressure caused by closing of the first valve, said second valve moving to an open position to allow flow to the reservoir.

10. The system according to claim 9, including a third pneumatically-actuated normally-open valve located in the exhaust pipe between the purge duct and the engine, the third valve being operatively connected to the second pneumatic line upstream of the second valve, said third valve moving to a closed position to stop flow from the engine thereby isolating the filter during regeneration.

11. The system according to claim 1, further comprising a vacuum pump in fluid communication with said reservoir and operable for reducing pressure within said reservoir.

12. The system according claim 1, wherein said system is associated with a vehicle and said source for pressurized air is an air brake system of said vehicle.

13. A non-thermal system for regenerating a particulate trap in an exhaust system of an internal combustion engine comprising:
  a wall-flow particulate trap located in an exhaust pipe of an engine and having a plurality of porous walls for filtering a flow of engine exhaust and removing particulates therefrom to form a particulate cake on an upstream first side of the porous walls wherein a flow of filtered exhaust gas flows downstream from a downstream second side of the porous walls,
  a plurality of valves for periodically creating a reverse pressure throughout said entire trap to regenerate said trap by creating an instantaneous reverse pressure drop across the porous walls of said entire trap to dislodge accumulated particulate cake and causing the filtered exhaust gas to flow back through the porous walls as a flow of back-flow gas to remove dislodged particulate from said entire trap and carry the dislodged particulate therefrom;
  a reservoir operatively connected to the exhaust pipe for receiving the back-flow gas carrying the dislodged particulate from said trap and storing said dislodged particulate, said reservoir being closed from atmosphere; and
  a one-way conduit leading from the reservoir to the exhaust pipe for controlling a return flow of gas from the reservoir after receipt of the dislodged particulate from the trap so that said return flow of gas returns to the flow of the exhaust gas and passes through the particulate trap, thereby providing a closed system in which only filtered gases are released to atmosphere.

14. The system according to claim 13, wherein the plurality of valves includes a first pneumatically-actuated normally-open valve.

15. The system according to claim 14, including a first pneumatic line interconnecting the first valve with the exhaust pipe, the first valve being responsive to a build-up in pressure caused by clogging of the filter thereby determining the need for regeneration, said first valve moving to a closed position to start a regeneration cycle.

16. The system according to claim 15, wherein the operative connection of the reservoir to the exhaust pipe is a purge duct and wherein the plurality of valves includes a second pneumatically-actuated normally-closed valve associated with the purge duct.

17. The system according to claim 16, including a second pneumatic line interconnecting the second valve with the exhaust pipe, the second valve being responsive to build-up of pressure caused by closing of the first valve, said second valve moving to an open position to allow flow to the reservoir.

18. The system according to claim 13, further comprising a vacuum pump in fluid communication with said reservoir and operable for reducing pressure within said reservoir.

19. The system according claim 13, wherein said system is associated with a vehicle and said source for pressurized air is an air brake system of said vehicle.

20. A method of regenerating a particulate trap in an exhaust system of an internal combustion engine, comprising the steps of:
  filtering a flow of exhaust gas from an engine through a particulate trap having an upstream first side and a downstream second side of said trap wherein particulate matter collects on said first side and a flow of filtered exhaust gas passes downstream from said second side for exhausting to atmosphere;
  creating a back pressure throughout the entire exhaust system to a pre-selected level to generate a reverse flow of the filtered exhaust gas through said trap to dislodge said particulate cake;
  releasing the back pressure at a location upstream of the trap and creating a pressure drop across the entire trap and reversing flow through the entire trap sufficient to generate said reverse flow of the filtered exhaust gas and release the particulate matter stored in the entire trap;
  directing gases in the reverse flow and the released particulate matter into a receptacle which is closed from the atmosphere;
  collecting the released particulate matter;

bleeding the gases in the receptacle back to the flow of exhaust gas upstream of the particulate trap to thereby flow through the trap with the flow of the exhaust gas to provide a closed system in which only filtered gases are released to atmosphere downstream of the particulate trap; and resuming normal filtration after the step of collecting the released particulate matter.

\* \* \* \* \*